(12) United States Patent
Vandamme

(10) Patent No.: US 6,493,942 B1
(45) Date of Patent: Dec. 17, 2002

(54) FLATWARE FOR SPAGHETTI

(76) Inventor: Paul Vandamme, Pradostraat 16/3, B-1080 Brussels (BE)

( * ) Notice: Subject to any disclaimer, the term of this patent is extended or adjusted under 35 U.S.C. 154(b) by 0 days.

(21) Appl. No.: 09/600,059

(22) PCT Filed: Jan. 5, 1999

(86) PCT No.: PCT/BE99/00001

§ 371 (c)(1),
(2), (4) Date: Oct. 5, 2000

(87) PCT Pub. No.: WO99/34715

PCT Pub. Date: Jul. 15, 1999

(30) Foreign Application Priority Data

| Jan. 9, 1998 | (BE) | ............................................... 9800018 |
| Feb. 4, 1998 | (BE) | ............................................... 9800085 |

(51) Int. Cl.[7] .............................................. A47G 21/02
(52) U.S. Cl. .............................. 30/150; 30/322; 30/324
(58) Field of Search ....................... 30/147, 148, 149, 30/150, 322, 324, 142; D7/653, 663

(56) References Cited

U.S. PATENT DOCUMENTS

| 2,853,779 | A | * | 9/1958 | Lordo | ........................... 30/324 |
| 3,083,458 | A | * | 4/1963 | Tarson | ........................... 30/322 |
| 3,138,871 | A | * | 6/1964 | Sears | ........................... 30/322 |
| 4,334,355 | A | * | 6/1982 | Kalt | ........................... 30/322 |
| 5,833,284 | A | * | 11/1998 | Vandamme | ................. 294/1.1 |

FOREIGN PATENT DOCUMENTS

| FR | 710802 | * | 8/1931 | |
| FR | 1084768 | * | 7/1954 | ................. 30/322 |

* cited by examiner

*Primary Examiner*—Hwei-Siu Payer
(74) *Attorney, Agent, or Firm*—Mark Zovko

(57) ABSTRACT

The invention relates to a flatware set for spaghetti. When spaghetti is eaten, the spaghetti threads are taken up onto the fork by turning the fork on its axis. In order to improve the spaghetti take-up, the fork (5) has the feature that the at least two teeth (8,9) extend substantially helically around a central axis of the fork. The fork teeth (8,9) then pick up the threads of spaghetti better. Despite a helical shape of the teeth (8,9), it is nevertheless possible to eat conveniently with this fork (5), since this fork (5) is pulled out of the mouth in a helical movement.

4 Claims, 6 Drawing Sheets

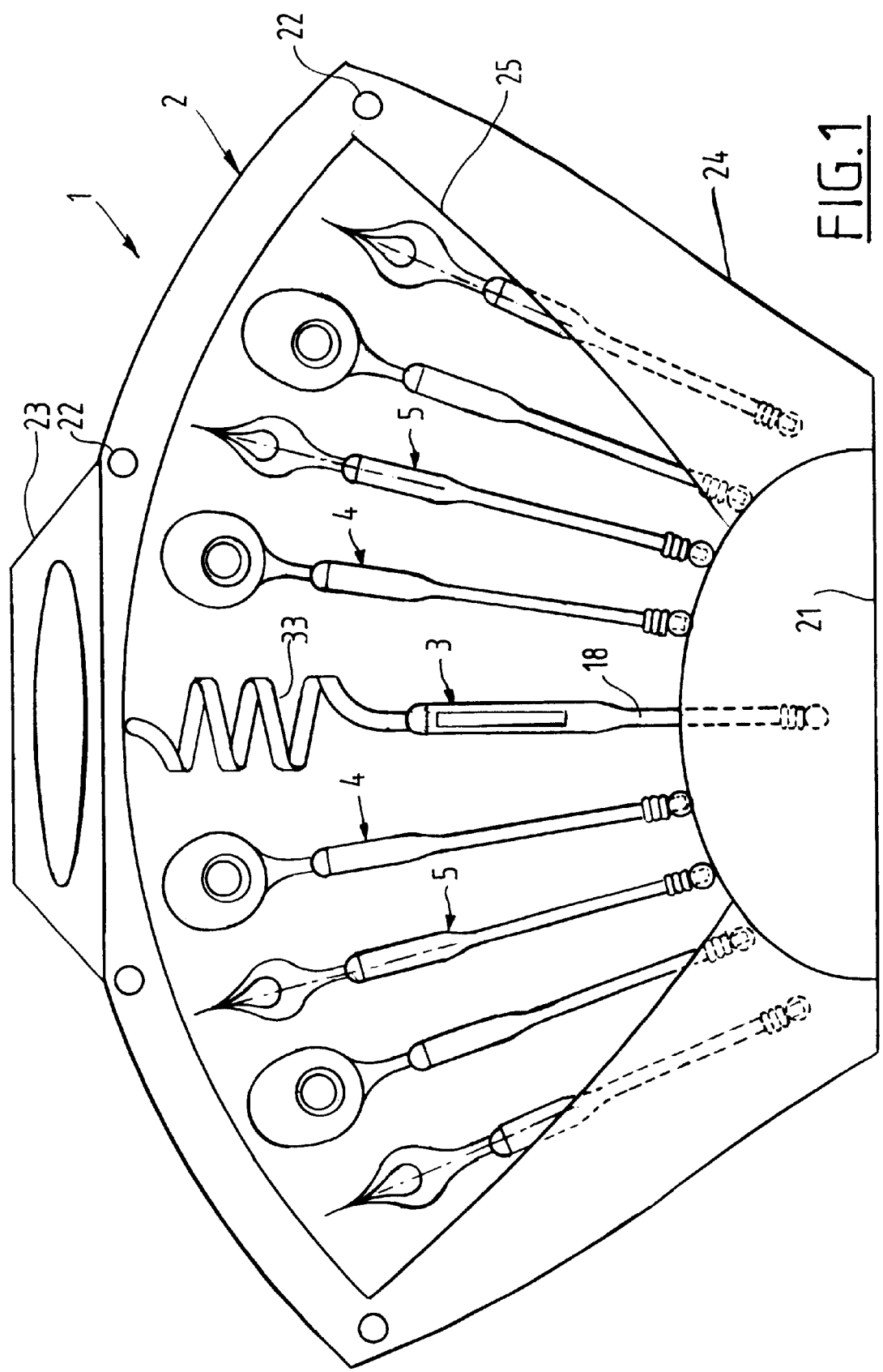

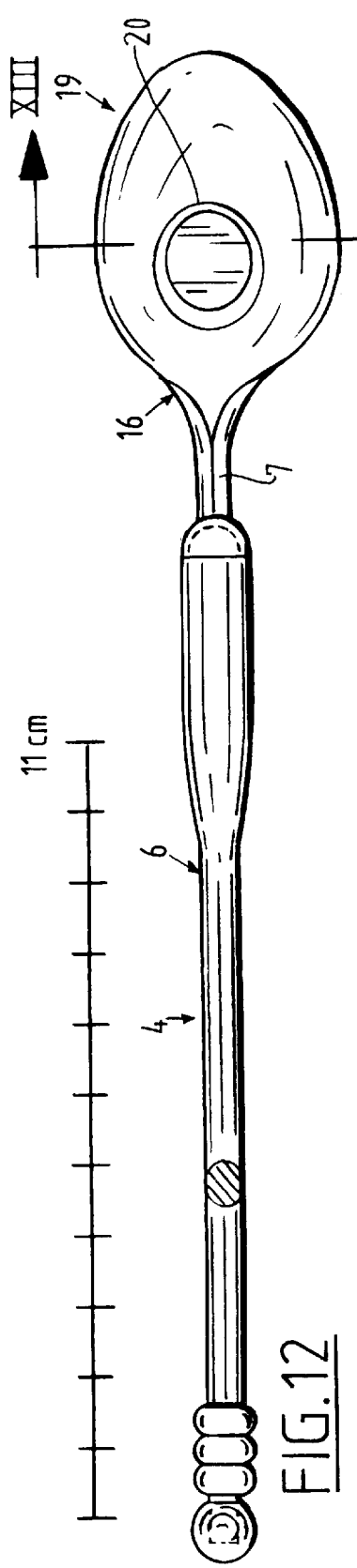
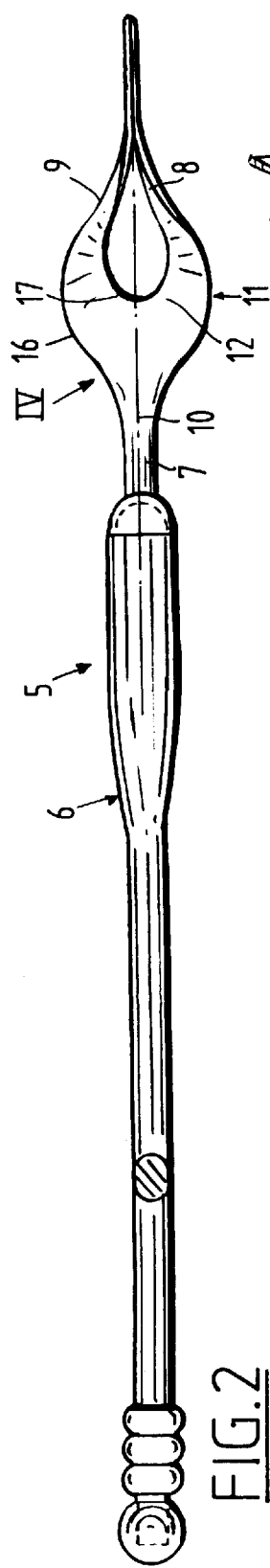
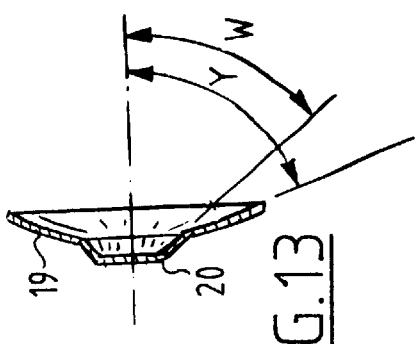
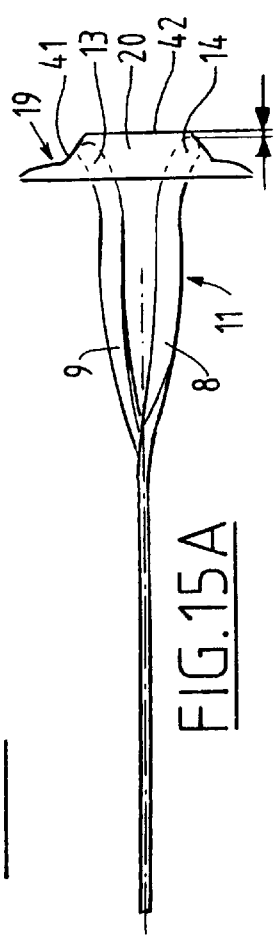
FIG. 12
FIG. 2
FIG. 13
FIG. 15A

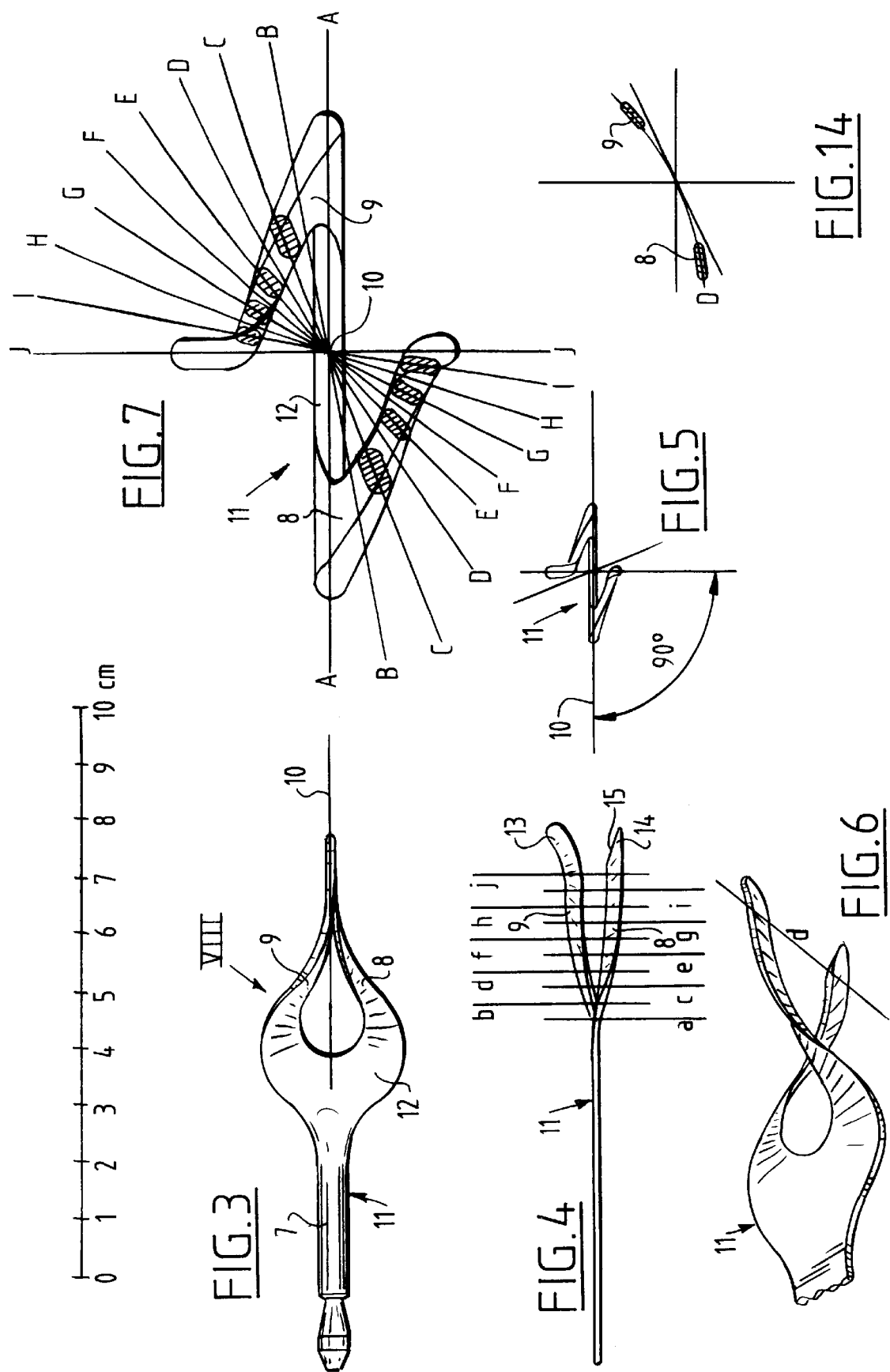

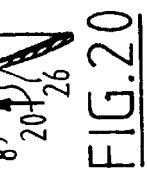
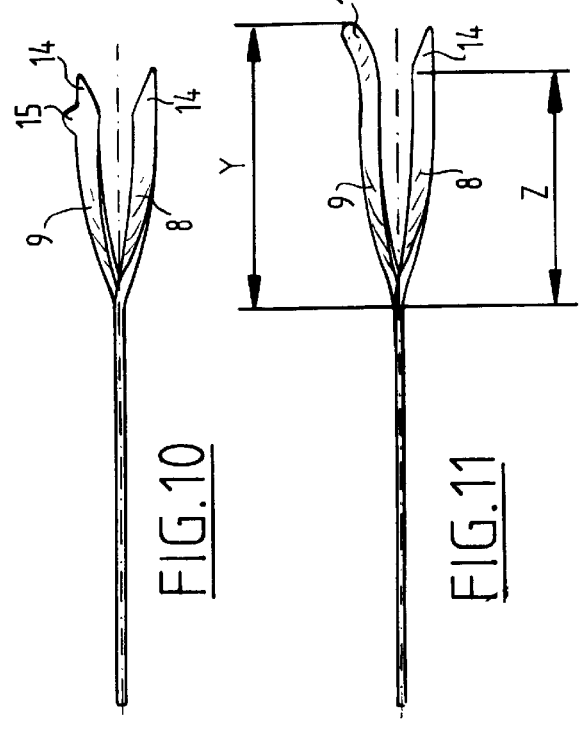
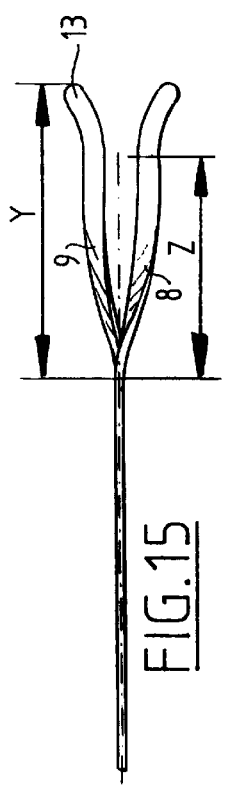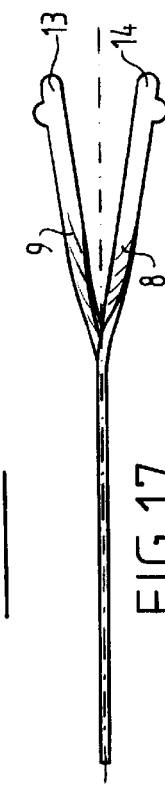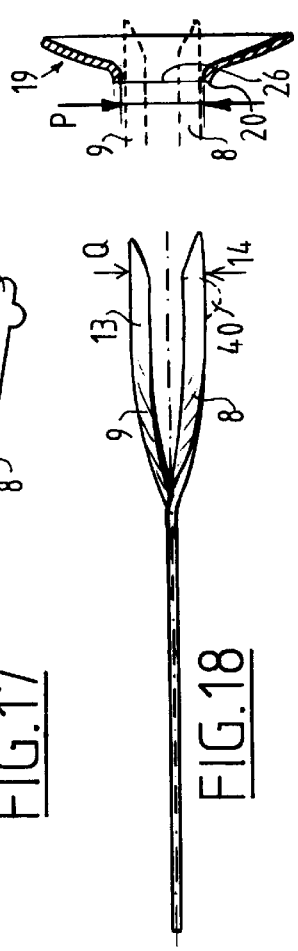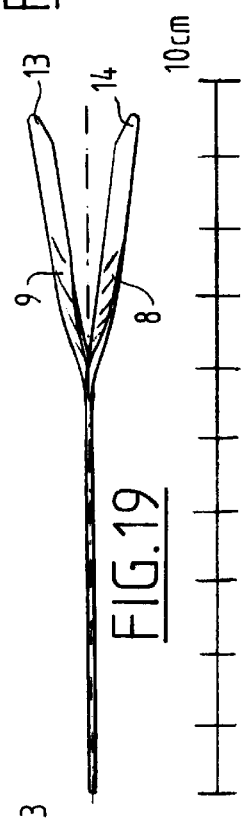
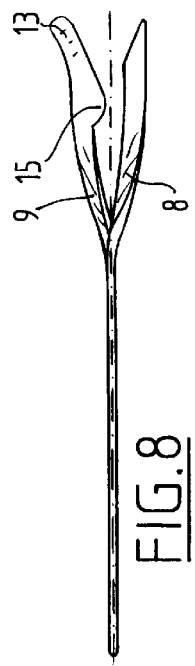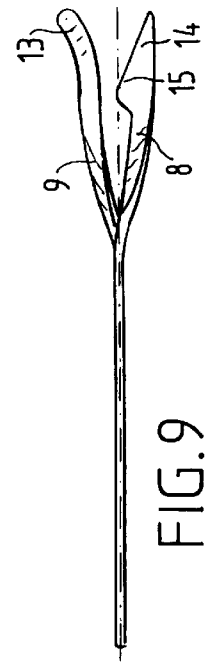

FLATWARE FOR SPAGHETTI

The invention relates to a flatware set for spaghetti.

When spaghetti is eaten the spaghetti threads are taken up onto the fork by turning the fork on its axis. The fork teeth then pick up the threads of spaghetti better. Despite a helical shape of the teeth, it is nevertheless possible to eat conveniently with this fork since this fork is pulled out of the mouth in a helical movement.

The invention also provides a flatware set with at least one spoon specially designed for the spaghetti meal and the like.

The invention further provides a flatware set which as a whole has an attractive appearance due to a high degree of uniformity of the essential flatware elements.

Finally, the invention provides a spaghetti server which is simple to manufacture.

The invention will be elucidated in the description following hereinbelow with reference to drawings, in which:

FIG. 1 shows a holder with diverse flatware elements;

FIG. 2 shows a top view of a fork;

FIGS. 3, 4 and 5 show respectively a bottom view, a side view and a front view to actual size of a metal detail IV of FIG. 2;

FIG. 6 shows a perspective view of detail VI of FIG. 3;

FIG. 7 shows FIG. 5 on enlarged scale with cross-sections at the positions c, e, g and i of FIG. 4;

FIGS. 8–11, 15–19 and 23 show variants of detail VIII of FIG. 3;

FIG. 12 shows a top view of a spoon;

FIG. 13 shows a cross-section XIII—XIII of FIG. 11;

FIG. 14 shows a cross-section D through a variant of a fork according to the invention taken at the corresponding position d in FIG. 4;

FIG. 15A shows the combination of cooperating metal elements of fork and spoon;

FIG. 20 shows a cross-section through a spoon intended for co-action with the fork end of FIG. 18;

Figure 24:
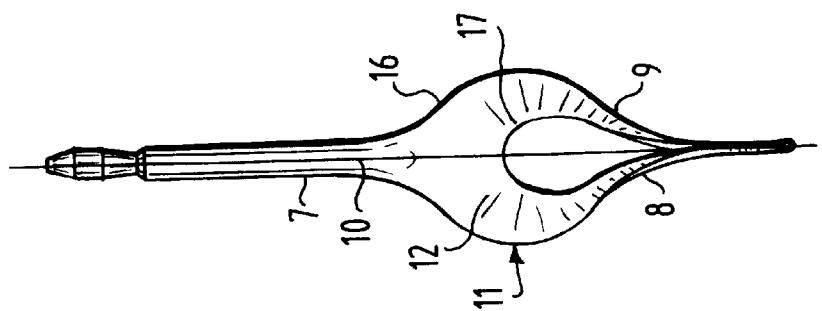
FIG. 24 is a side view of the detail of FIG. 23.
Figure 23:
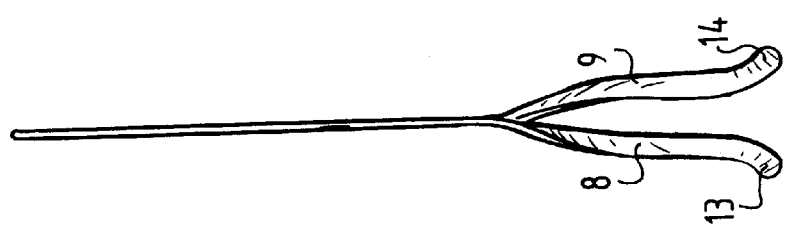

The spaghetti flatware set 1 according to the invention is preferably placed in a holder 2 in which the flatware elements, i.e. a spaghetti server 3 as according to WO 96/18334 or as according to FIGS. 26–29, a plurality, for instance 4, 6, 8 or 12, of spoons 4 and a plurality, for instance 4, 6, 8 or 12, of forks 5, are disposed in a fan shape, which produces a fantail appearance, particularly if these elements are arranged over more than 45°, for instance over an angle of between 60° and 150°, at substantially uniform angular distances.

This flatware set 1 is intended and particularly suitable for eating spaghetti, i.e. thick or thin, solid or hollow threads of pasta, which may or may not be mixed with sauce and/or pieces of meat and/or vegetables.

Holder 1 consists of two shells 24 which are mutually connected for pivoting by means of a hinge 21, which are mutually fastened for instance with press-stud connections 22 and which each have a carrying handle 23.

The upper shell 24 has a transparent window 25 and lower shell 24 has recesses or clamps (not shown) for fixedly holding flatware elements 3–5.

Each fork 5 has a, for instance metal, eating element 11 comprising an elongate attachment 7 mounted in an essentially rotation-symmetrical handle 6, a curved shoulder 12 connecting thereto with roundings 16 and having two teeth 8, 9 connecting thereto.

The outer rounding 16 and inner rounding 17 of shoulder 12 give the appearance of circle parts lying one within the other and having centres which are slightly shifted relative to one another. Teeth 8, 9 are bent helically round a central longitudinal axis 10 through substantially 90° from a horizontal plane of FIG. 3 into a vertical plane of FIG. 4. At diverse mutually spaced positions a, b, c . . . j the two teeth 8, 9 preferably have their width directions in common planes A, B, C . . . J, so that when this fork 5 is withdrawn helically from the mouth a person always feels between teeth and lips a substantially smooth eating element 11 which is continuous even in transverse direction and preferably substantially flat.

FIG. 14 is an example of a cross-section wherein teeth 8, 9 extend in a transverse plane which is preferably smooth, slightly curved and in any case adapted to the mouth.

Tooth 9 has an outwardly curved free end 13, whereby the entrance between teeth 8, 9, is enlarged, while this end 13 also functions as hook, whereby threads of spaghetti are held fast when the fork is in downward directed position. Tooth 8 has a pointed free end 14 with an inner surface 15 with enlarges entrance 16 towards the outside. Pieces of meat and/or vegetables can be pierced with this pointed end.

In FIGS. 8–10 tooth 9 has the same end 14 as tooth 8.

In FIGS. 9 and 10 a spaghetti-hooking protuberance 15 is arranged at different positions.

Spoon 4 and fork 5 preferably have an identical handle 6 which preferably has the same shape as, but is smaller than the handle 18 of spaghetti server 3. All, for instance wooden, handles 6 and 18 each preferably have a semi-spherical and a spherical end, preferably of metal.

The metal eating part 19 of spoon 4 and the eating part 11 of fork 5 preferably have identically shaped roundings 16. Eating element 15 is spoon-shaped with a round recess 20 in which tooth ends 13, 14 of a fork 5 can be received for rotation.

Fork 5 and spoon 4 are drawn to actual size in FIGS. 2–5, 8–13 and 15–29. The measured size and form of elements and details thereof are used as technical information of the preferred embodiment.

Eating elements 11 and 19 and serving part 33 also function if the embodiments differ from those drawn. The variations preferably remain within the tolerance of ±100%, more preferably ±50% and most preferably ±25%.

The screw of teeth 8, 9 can optionally already begin on their free ends and may or may not extend over more, or even less, than about 90° of the distance Y or Z. The spiral preferably makes an angle of at least 30°, at least 45° or at least 60° and for instance less than 190°, preferably less than 140°.

Each of the forks with helical teeth 8, 9 shown in FIGS. 2–11 and 14 can be used as spaghetti server if it is large enough to pick up a serving portion of spaghetti. For this purpose its length is for instance between 200 and 700%, preferably between 300 and 600% and more preferably between 400 and 500% of the length shown to scale in the figures. A larger take-up capacity which is suitable for serving is obtained by lengthening the teeth, wherein teeth 8, 9 are optionally spiralled through considerably more than 90%, and/or by slightly widening the fork, wherein a for instance straight central tooth is optionally added.

Figure 22:
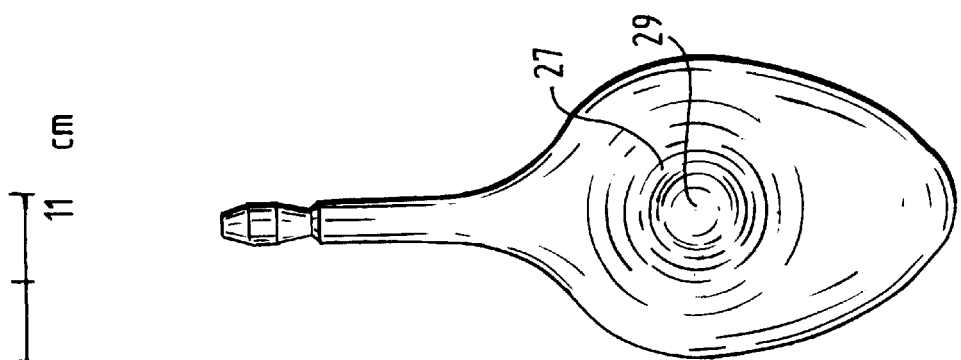
FIG. 22 is a top view of a spoon according to the invention which, as shown in FIG. 21, is intended for co-action with the fork end of FIG. 23.
Figure 25:
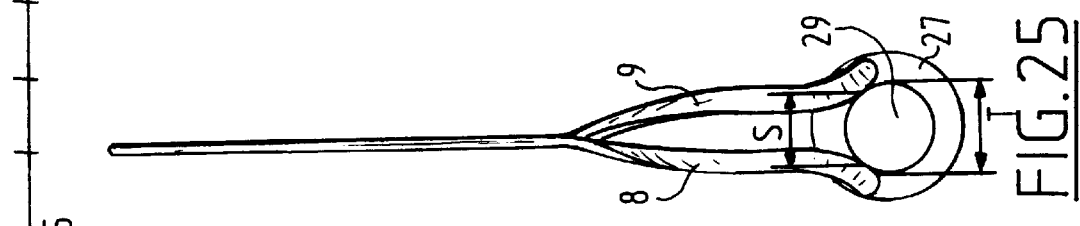
FIG. 25 shows a schematic working diagram of FIG. 21.
Figure 21:
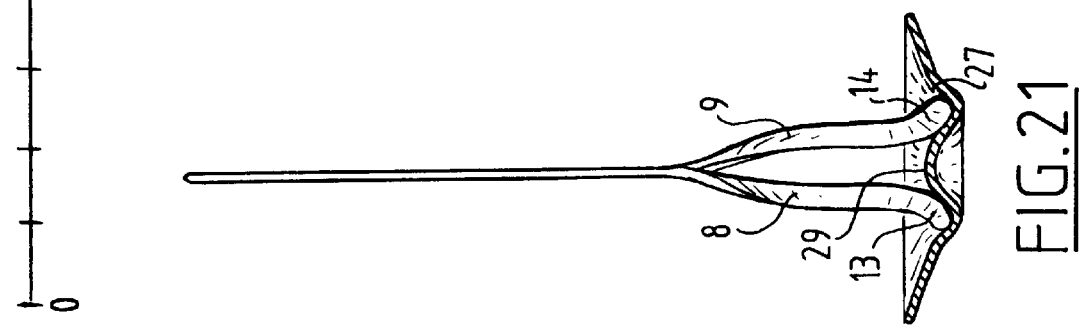
FIG. 21 shows a spoon.

Spoon 4 has a guide which defines the rotation path of the fork end and which is formed by a recess 20 (FIGS. 12, 13), by a round hole 26, of which the diameter P if just slightly larger than the outer dimension Q of tooth ends 13, 14 (FIGS. 18, 20), or by a ring groove 27 (FIGS. 21, 22 and 25). The distance S between the contact points of fork ends 13, 14 is herein slightly smaller than the diameter of the upward protuberance 29 encircled by the ring groove. A trailing guide is hereby created which suppresses or at least reduces grating sounds.

The guide of the spoon and preferably also each tooth end are preferably polished.

A surface treatment increasing smoothness is also effective against noise formation. For this purpose a special lining can be arranged on the spoon at the position of the guide and/or the fork ends 13, 14 can be provided for this purpose with a glass layer by immersion.

The eating elements 11 and 19 of FIG. 15A cooperate in such manner that the conical guide plate 41 of the recess 20 guides the free ends 13, 14 of the teeth 8, 9. The dimensions are such that both ends 13, 14 do not simultaneously touch the bottom 42, unless the fork is pressed into the spoon with such force that the teeth 8, 9 are elastically deformed and the ends 13, 14 do approach each other a little. This deadens possible teeth vibrations and so deadens possible squeak noise.

In the case the guide is an edge hole 26, one or each of the two teeth 8, 9 has at a distance of for instance 5 mm from their free ends an outward protuberance 40 which serves as stop.

Figure 28:
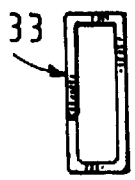
FIGS. 26–28 show views of a spaghetti server.
Figure 29:
FIG. 29 shows a cross-section along line XXIX—XXIX of FIG. 27.
Figures 26, 27:
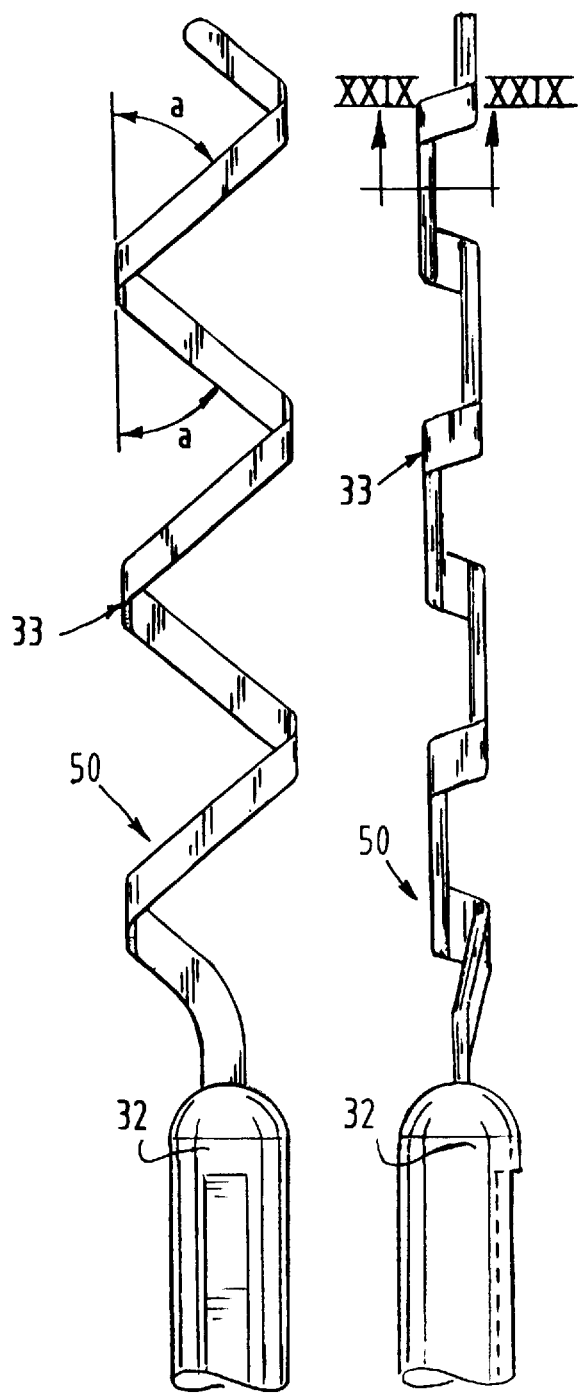

The spaghetti server 50 of FIGS. 28, 29, comprising handle 32 and non-round spiral 33, is manufactured from one injected moulded article of sturdy plastic, for instance fibre-reinforced plastic.

The form of the spaghetti-engaging spiral is releasing.

The cross-section (FIG. 29) is for instance half-round with preferably rather sharp edges.

Each of said handles is preferably rotation-symmetrical or at least essentially rotation-symmetrical. These handles can for instance have longitudinal ribs and/or one or more longitudinal recesses, provided with a brand name or an identification mark.

What is claimed is:

1. Flatware (1) for spaghetti, comprising at least one fork (5) with at least two teeth (8, 9), characterized in that the at least two teeth (8, 9) extend substantially helically a round a central axis (10) of the fork (5), and further characterized in that at least one of the fork teeth (8, 9) has at least one hooking protuberance (13, 15), wherein at least one of the at least two teeth (8, 9) has an end (13) curving away from the other tooth.

2. Flatware for spaghetti comprising at least one fork with two teeth, said two teeth extending substantially helically a round a central axis of the fork, said two teeth fitted on a shoulder of said fork in accordance with an internal rounding of substantially a semi-circle.

3. Flatware for spaghetti comprising a plurality of forks, said forks having at least two teeth, said teeth extending substantially helically a round a central axis of said forks, the flatware further including a plurality of spoons and a spaghetti server, all having a handle (6, 18) of substantially identical shape which is substantially rotation-symmetrical, wherein the handle (18) of the spaghetti server (3) is longer than the handles (6) of the forks (5) and the spoons (4).

4. Flatware (1) as claimed in claim 3 characterized in that at least the forks (5) and spoons (4) are arranged in the form of a fan in a holder (2) which is provided with a carrying handle (23).

\* \* \* \* \*